United States Patent [19]
Laronze

[11] 3,835,339
[45] Sept. 10, 1974

[54] IMPROVEMENT RELATIVE TO LINEAR INDUCTION MOTORS AND COOLING DEVICES APPLIED TO THE SAME

[75] Inventor: Joseph Laronze, Tassin La Demi-Lune, France

[73] Assignee: Compagnie Electro-Mecanique, Paris, France

[22] Filed: May 9, 1973

[21] Appl. No.: 358,511

[30] Foreign Application Priority Data
Dec. 8, 1972  France .............................. 72.44437

[52] U.S. Cl. ..................... 310/13, 310/16, 310/64, 336/61
[51] Int. Cl. ........................................... H02k 41/02
[58] Field of Search ............. 310/12, 13, 16, 64, 65, 310/215; 336/61

[56] References Cited
UNITED STATES PATENTS

| | | | |
|---|---|---|---|
| 3,207,934 | 9/1965 | Robinson et al. .................. | 310/64 X |
| 3,662,195 | 5/1972 | Wielt ................................. | 310/64 |
| 3,668,444 | 6/1972 | Davey ............................... | 310/13 |

Primary Examiner—Gerald Goldberg
Attorney, Agent, or Firm—Pierce, Scheffler & Parker

[57] ABSTRACT

A linear induction motor comprises armature and inductor components one of which is mounted for movement along a rectilinear path relative to the other. The inductor component includes a rectangular laminated body made from sheets of magnetic material and which provides a row of spaced teeth confronting the armature member, longitudinally spaced energizable coil means surround the body of the inductor between the teeth and longitudinally spaced heat-radiating units made from a material, which has good heat-conductivity characteristic, and is also amagnetic, surround the inductor body on all sides except the toothed side. These heat radiating units are provided with vaned surfaces to collect part of the heat given off by the coils and other vaned surfaces for dissipating the heat thus collected to the ambient air. If the heat-radiating unit is made from a material which is also electrically conductive, it effects a reduction in leakage flux.

9 Claims, 13 Drawing Figures

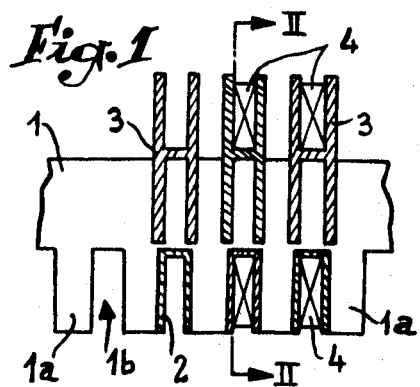
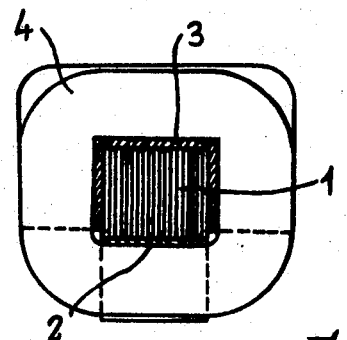
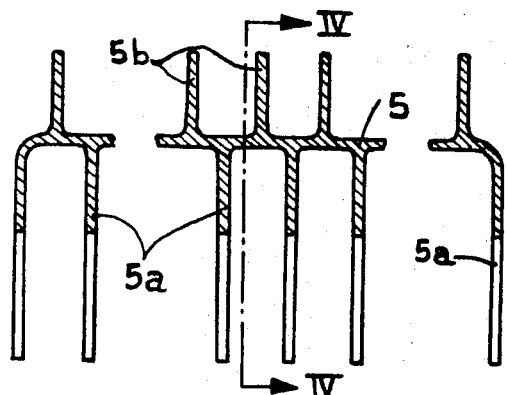
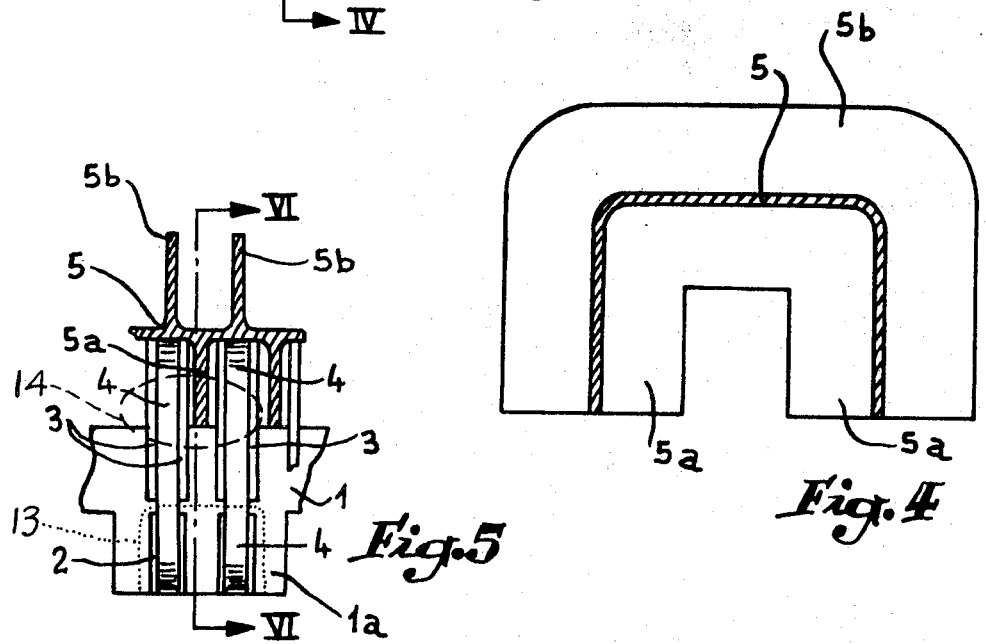

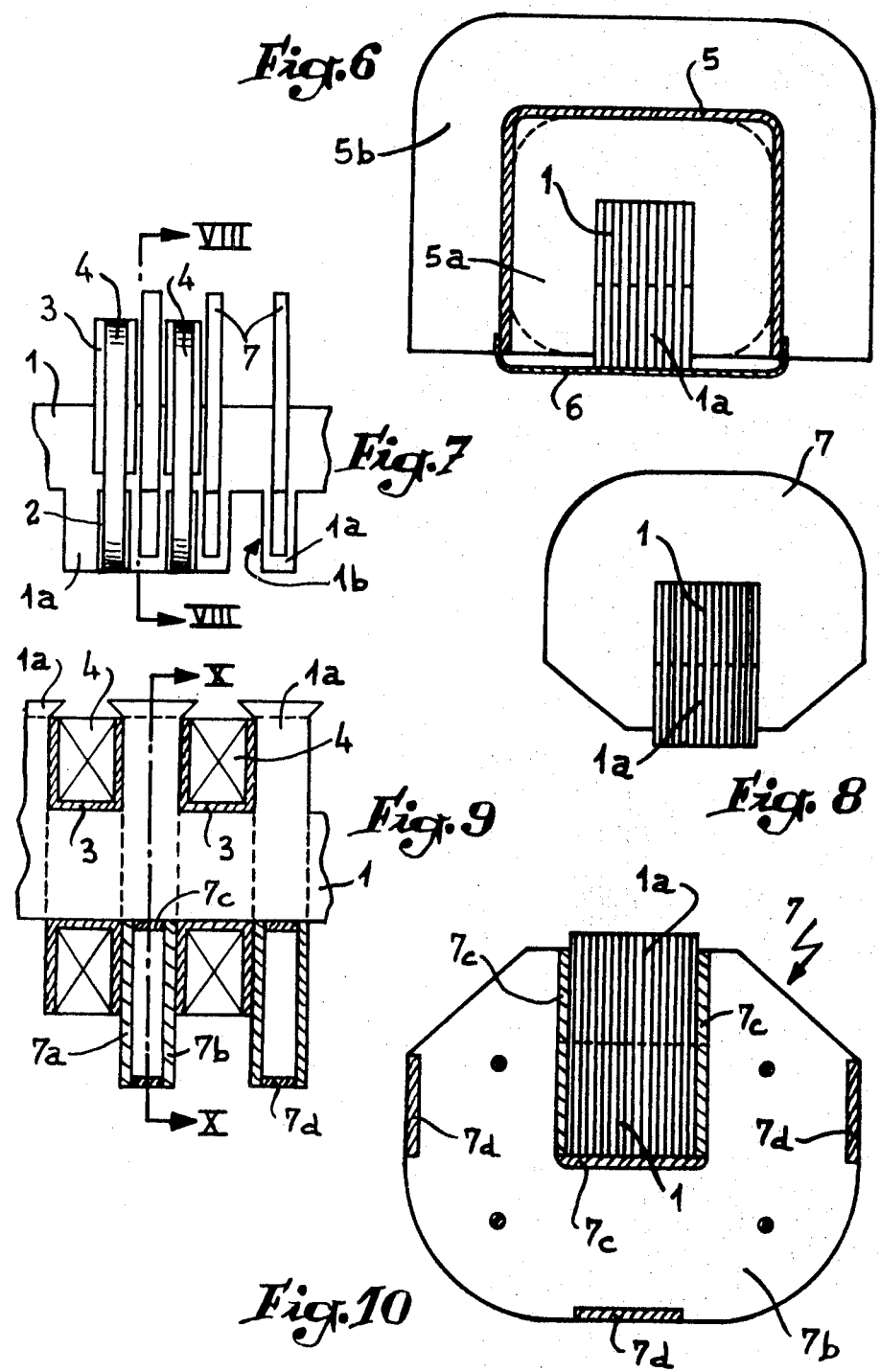

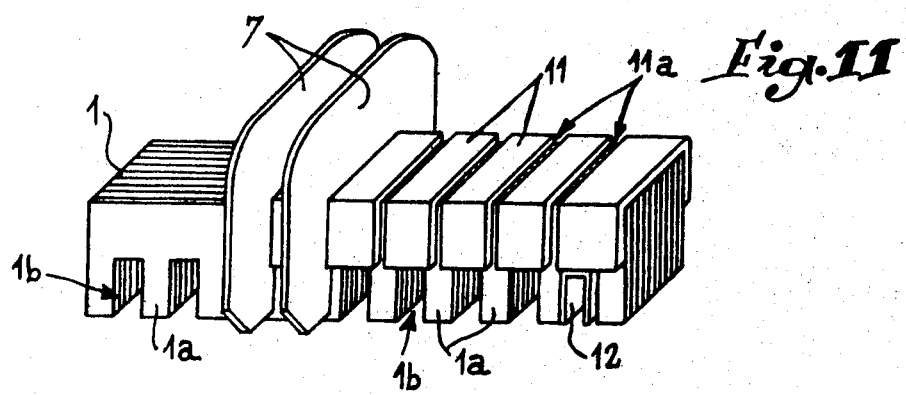
Fig. 11
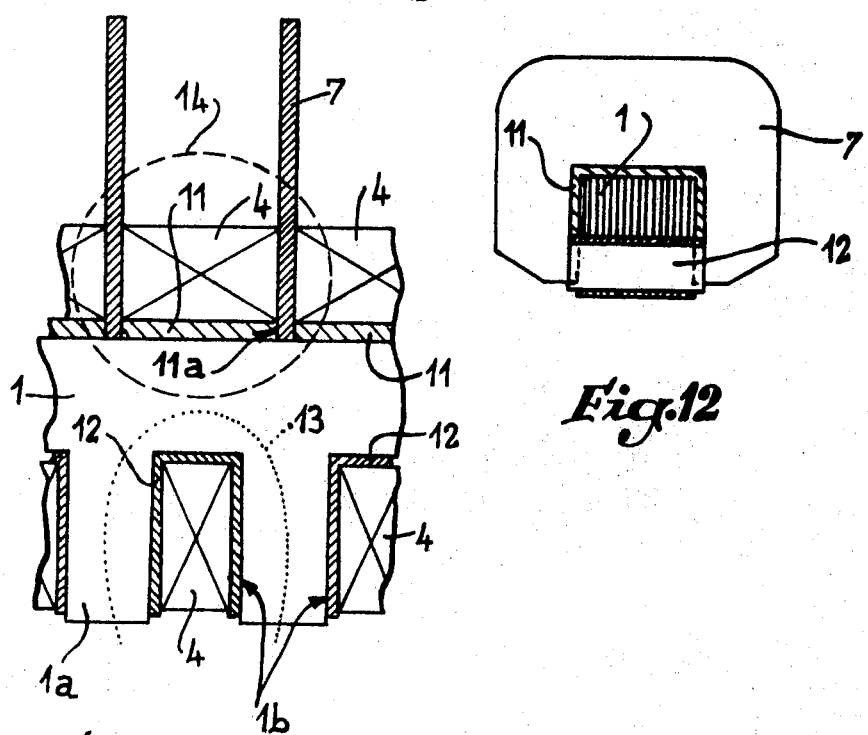
Fig. 12
Fig. 13

IMPROVEMENT RELATIVE TO LINEAR INDUCTION MOTORS AND COOLING DEVICES APPLIED TO THE SAME

The present invention relates to so-called "linear" induction motors used to effect the displacement of a load along a path that is not necessarily closed on itself, and capable of having rectilinear parts and/or parts with different radii of curvature. These motors comprise an inductor functioning as a "primary," equipped with windings fed by a suitable source of electric energy, and an armature functioning as a "secondary", traversed by the mobile magnetic field generated by the inductor in such a way as to be entrained by the latter in relative movement in the manner of the rotor of an asynchronous motor. According to applications, the inductor can be mounted fixedly, the armature being mobile (for example in the case of a carriage which is to be made to come and go on a short path), or, on the contrary, the armature can be fixed and the inductor borne by a mobile device (which is the solution most often adopted in the case of vehicles with linear motors).

The present invention has for its principal purpose to improve the operation of "ring" wound linear motors. In such motors, the inductor is constituted by a packet of metal sheets having a certain number of notches in which the windings are lodged. These windings appear in the form of one coil per notch, the coils being situated in planes perpendicular to the sheets and to the direction of movement. Each coil, therefore, imprisons the yoke of the magnetic circuit. It is possible, in order to improve the solidity of the whole, to embed the inductor in a suitable insulating mass. One thus obtains an inductor very simple to make and very strong.

However, this arrangement has two drawbacks: on the one hand the removal of the heat due to the various losses is poor, and on the other hand, in the part outside the iron there is a flux leakage which can be substantial, and which thus contributes nothing to the displacement of the moving body.

The present invention proposes, on the one hand, to improve the dissipation of heat from the coils, and on the other hand to diminish the leakage flux, by applying simple means which remain valid whether the inductor is fixed or mobile.

According to the invention, the inductor carries at least one radiator unit made of a material which is a good conductor of heat and is amagnetic, which surrounds it on substantially three sides, and comprises, on the one hand, interior vanes in the form of vanes, proper to collect at least a fraction of the heat given off by the windings and the magnetic mass, and on the other hand, exterior vanes able to dissipate into the ambient air, the heat thus collected.

According to the invention, the material of the radiator unit, as stated, which is a good conductor of heat and amagnetic, can also be a good conductor of electricity in such a way as to diminish the leakage flux.

The interior means consist, preferably, in at least one interior vane engaged between two successive coils of the winding and straddling the magnetic mass of the inductor, with or without interposition of a layer of insulating material.

In a first form of execution, the radiator unit has a body with a U profile fitted over the inductor equipped with its coils, this body being solid with a certain number of interior vanes which engage on the magnetic mass between the coils in the above mentioned manner, and a certain number of exterior vanes which, as mentioned above, evacuate the heat collected by the interior vanes.

In a second form of execution, the radiator unit is constituted by at least one plate cut in a U shape, which is lodged between two successive coils, and projects radially on three sides of the latter in such a way as to constitute, simultaneously, an interior vane and an exterior vane.

In other of the forms of execution, the interior vanes can be provided with double or multiple walls, in such a way that it will be possible to have them completely fill the space separating the successive coils, without having to make them unnecessarily heavy and thick.

In either of the forms of execution, each coil creates a magnetic field. An induction flux therefore passes through the yoke and the teeth, then the air-gap; this is a useful flux which takes part in the creation of the force. But in the same way, an induction flux passes through the vanes. This is a leakage flux. The variations in this flux generate, in these vanes, a current which in turn creates a magnetic field which tends to oppose the field which created it. If the vanes are made of a material which is a good conductor of electricity, one thus substantially diminishes the leakage field of the coils, the vanes playing the part of a magnetic screen between the various coils.

The attached drawings of preferred embodiments, given by way of example, will enable a better understanding of the invention, the characteristics which it discloses, and the advantages which it is capable of producing.

FIG. 1 is a partial longitudinal section of an inductor for linear motor designed to receive an application of the invention, the magnetic mass being represented during the assembly of the coils.

FIG. 2 is a section along line II—II of FIG. 1.

FIG. 3 is a view in longitudinal section of the radiator unit designed to be disposed on the mass in FIGS. 1 and 2, as soon as the coil is mounted in place.

FIG. 4 is a section along line IV—IV of FIG. 3.

FIG. 5 is a partial side view of the finished motor, the radiator unit being assumed to be cut for clarity in the drawing.

FIG. 6 is a section along line VI—VI of FIG. 5.

FIG. 7 is a partial side view of a linear motor according to another form of execution of the invention.

FIG. 8 is a section along line VIII—VIII of FIG. 7.

FIG. 9 is a longitudinal section of a variant.

FIG. 10 is a cross section along line X—X of FIG. 9.

FIG. 11 is a partial side view of a linear motor according to another form of embodiment of the invention.

FIG. 12 is a scross section of FIG. 11.

FIG. 13 is a longitudinal section on a larger scale of FIG. 11.

The inductor represented in FIGS. 1 and 2 comprises a rectilinear magnetic member including a rectangular body portion 1, made in the usual form of a laminated stack of metal sheets suitably profiled to establish a row of equidistant teeth 1a which are assumed to be oriented downwardly. In each of the notches 1b separating the teeth 1a, an insulating lining 2 is lodged. In addition, the part of the laminated body located above the row of teeth 1a is straddled by insulating members 3 which cooperate with the linings 2 to define lodgings in which the coils 4 of the winding are formed. These coils are represented in section by a simple rectangle barred with its two diagonals.

The insulation, and the fixation of the coils can, of course, be complemented by any appropriate application of linings, coating materials, etc.

The radiator unit designed to be installed on the inductor in FIGS. 1 and 2 after its winding is complete, is constituted by an amagnetic metal which is a good conductor of heat and of electricity, such as, for example, aluminum. It consists of a body 5 (FIGS. 3 and 4) which, in cross section, has a U-shaped profile. This body is solid with interior vanes 5a which likewise have a crosswise U-shaped profile, and are sunk into the spaces separating the successive coils and straddle the magnetic body 1, but clear the ends of the teeth 1a as shown in FIG. 6. Vanes 5a can be in direct contact with the laminations of the body 1, inasmuch as they are not closed around the latter, but as a precaution one can arrange an intermediate, insulating layer not shown. The body 5 also carries exterior vanes 5b oriented in the opposite way to vanes 5a, and preferably descending to the lower edge of the latter.

As illustrated in FIG. 5, the interior vanes 5a oppose the leakage flux of the coils in the manner described above, acting as a magnetic screen between the various coils. The dotted lines at 13 show a path of useful flux, and in broken lines 14, a path of parasite leakage flux. It is clearly shown that the inner vanes 5a are interposed in the leakage flux paths 14.

In addition, it will be understood that when the motor is in operation, the interior vanes 5a engaged between the cheeks of the coil-holding bodies 3 and in relatively intimate contact with the magnetic body 1 will collect a substantial fraction of the heat given off by the motor in operation, and that they will transfer it by conduction to the exterior vanes 5b, which will transfer it to the ambient air. One has theretofore assured, in very simple fashion, both an efficient cooling of the motor and a reduction of the leakage fluxes.

Vanes 5b have been shown offset relative to vanes 5a, but they can, of course, be placed in opposition for better cooling efficiency when the method of construction permits.

One can, of course, after mounting the radiator unit, invert the assembly and pour into the body 5 any desired coating composition, with a view to improving the transmission of heat, and for protection against exterior agents. It is also possible to imagine that the thickness of the interior vanes 5a can vary and, if desired, even reach a value equal to the interval separating the opposing faces of the cheeks of the coil-holding members 3, in such a way as to produce a heat-conducting contact between these cheeks and the vanes. It should also be noted that vanes 5a can ensure, or contribute to the ensurance of, the gripping of the laminations of the magnetic circuit 1 in the vicinity of teeth 1a.

In the case of small scale production, or when making motors of different lengths, the foregoing solution leads to high cooling costs. In this case one can resort to a simplified version of the foregoing model, described below with reference to FIGS. 7 and 8.

In this form of execution, a series of elementary radiator units is combined with the successive coils of the motor. Each of them is constituted by a plate 7, likewise made of amagnetic metal with high thermal and electrical conductivity, for example aluminum or the like, which is cut in a U shape so that it can straddle the magnetic circuit 1 between the opposite cheeks of two consecutive coiling holding members 3, that is to say substantially in the axis of tooth 1a situated between the two corresponding coils, projecting radially for a considerable distance beyond the said coils. One may consider that plate 7 so established, represents the equivalent of an interior vane 5a and an exterior vane 5b in the preceding form of execution, these vanes being disposed here in a given transverse plane and are rigidly solid with one another, since body 5 is eliminated. One will understand that there again, plate 7 can have a width equal to the interval of the cheeks in opposition, in such a way as to apply intimately against the latter, as represented in FIG. 7. It will also be noted that most of the remarks made in the course of the description of the first form of execution are valid for the second.

FIGS. 9 and 10 show a variant of the form of execution in FIGS. 7 and 8, according to which plate 7 is made more or less with a double wall, that is to say it is constituted by two elementary plates 7a and 7b joined by cross-braces 7c and 7d surrounding magnetic circuit 1 on three sides. These braces are designed to maintain the interval between the two plates 7a and 7b. Thus created is an air circulation channel running from the end of the plates to the magnetic core, which further improves the cooling. These cross-braces can have any position between the two plates. By way of a non-limiting example, the interior cross-braces 7c are shown as resting on the magnetic circuit, and exterior cross-braces 7d. Naturally, when the plates are low in height, owing to the geometry of the motor, cross-braces 7d can then be unnecessary. Furthermore, if care is taken to make the plate assembly 7 a little bit thinner at the points of cross-braces 7c, and to have the two elementary plates 7a and 7b diverge somewhat, one obtains the advantage that the radiator units so embodied can be mounted with ease on the motor even if the tolerances of width and spacing at the coil-holding members 3 are relatively wide, and one can do so while continuing to ensure an intimate contact between these units and the cheeks of the coil-holding members.

It is understood that it would optionally be possible to make the interior vanes 5a in the first form of execution, likewise with double walls. It will also be understood that the single or multiple vanes 7 can be put in place either before or after the winding operation, without changing anything of the invention.

In FIGS. 11 and 12 13 another variant of the form of execution in FIGS. 7 and 8 is illustrated. In this form of execution, while the laminations constituting the magnetic circuit 1 are held tightly together, a coating 11 of epoxy resin is applied, this coating involving the yoke side and the lateral sides, but only up to the base of the notches 1b, that is to say that teeth 1a are left completely uncovered. Then in the coating thus obtained are made a series of transverse grooves 11a disposed in the median plane of the successive teeth, and with a width equal to the thickness planned for the plates 7. These grooves can be cut with a tool, or they can be reserved by any suitable means during the application of the coating. They pass entirely through the coating layer 11 and uncover the iron at least on the lateral sides, their depth on the yoke side being less, if desired.

Plates 7, made of an amagnetic material which is a good conductor of heat and electricity, such as copper or aluminum, are cut with a U-shaped notch, thanks to which they can straddle the magnetic circuit 1, around the latter, including the teeth 1a, on three sides, namely, the one corresponding to the face opposite the teeth (yoke side) and the two adjacent lateral sides.

Further moreover, these plates 7 are treated in such a way that their surface will be an insulating one, which can be obtained without difficulty, in particular by a deposit of a suitable adhesive material, for example, on epoxy resin.

The notches in these plates have been proportioned in such a way that, on the one hand their width will correspond without play to the total width of the iron of the magnetic circuit 1 (hence not including the coating), and on the other hand so that their depth will be scarcely less than the total height of the latter (distance between the plane of the iron on the yoke-side face, and that of the end facets of the teeth). One can then thread the plates 7, thus prepared, in the successive grooves 11a by the yoke side, as indicated in FIG. 11, this fitting being done with greater or lesser force inasmuch as no transverse play has been provided. If the need is felt, one can also fix the vanes 7 in the grooves 11a for example, by gluing or any other suitable means.

In order to complete the preparation of magnetic circuit 1, it is sufficient to dispose insulating channels 12 in the notches 1b, these channels having a length equal to the total width of the body, that is to say of the iron and the two thicknesses of the coating 11 against which their ends will press.

One can then proceed to the formation of the coils, each winding coil surrounding the packet of laminations 1, from which it is insulated by coating 11 and the corresponding insulating channel 12, while its lateral maintenance is ensured by the vanes of this channel 12 and by the insulating faces of plates 7.

Coating 11 and plates 7, therefore, in this form of execution, play the role of the insulating bodies 3 in the preceding forms of embodiment. The contact between coils 4 and vanes 7 is therefore improved, and the quantity of heat collected and evacuated by these vanes 7 is greater.

Furthermore, coating 11 and vanes 7 suffice to ensure maintenance of the laminations held against one another. More particularly, plates 7 guarantee by themselves the gripping of teeth 1a, dispensing with any auxiliary means such as riveting or gluing.

As mentioned before, vanes 7 also play the role of a magnetic screen between coils 4, owing to their good electrical conductivity as shown on FIG. 13, the vanes 7 being placed so as to extend through the leakage flux represented with broken lines 14, and hence oppose the crossing of this flux.

On the contrary, the useful flux represented with the dotted lines 13 may flow freely inside the magnetic core.

In this form of execution, as in the preceding, it is possible to divide each vane into two or more.

In FIGS. 9 and 10, the linear motor is oriented inversely to what is shown in the preceding figures, that is to say with teeth 1a turned upward. It will also be noted that these teeth have enlarged points, or in other words that the motor has semi-closed notches. These arrangements are in no way peculiar to the variant in FIGS. 9 and 10, and they have been represented only to make it clear that the invention is independent of these details of embodiment of the magnetic circuit of the motor itself.

I claim:

1. A linear type induction motor structure characterized by an inductor component comprising a laminated rectilinear member made from magnetic material including a main body portion serving as a yoke and a row of spaced teeth projecting from one side thereof to thereby establish coil slots therebetween, energizable ring-shaped coils surrounding the main body portion of said inductor component, each said coil having a portion thereof seated in a correspondingly positioned slot of said inductor component, and a U-shaped heat- radiating unit made from a metallic amagnetic material having a good heat conductivity characteristic and which straddles said rectilinear inductor component on three sides, said heat-radiating unit including one set of vane surfaces located respectively between corresponding portions of adjacently positioned coils for collecting part of the heat given off by said coils and functioning also as a magnetic screen between adjacent coils to oppose flow of leakage flux and further including another set of vane surfaces projecting beyond the peripheries of said coils for dissipating into the ambient air the heat collected from said coils.

2. A linear induction motor structure as defined in claim 1 wherein the material from which said heat-radiating unit is made is also electrically conductive.

3. A linear induction motor structure as defined in claim 1 wherein said heat-radiating unit comprises a body having a U-shaped profile which fits upon and straddles said inductor component, said U-shaped body being provided with a plurality of interior vanes engaged with the surface of the inductor component between adjacent coils, and a plurality of exterior heat dissipating vanes.

4. A linear induction motor structure as defined in claim 1 wherein said heat-radiating unit is constituted by U-shaped plates which straddle the body of said inductor component between adjacent coils and project radially on three sides thereby to constitute both a vane surface collecting heat and a vane surface for dissipating the collected heat to the ambient air.

5. A linear induction motor structure as defined in claim 4 wherein the body of said inductor component is covered by a layer of insulating material from the yoke side thereof to the level of the bottoms of the notches between adjacent teeth and said vanes are engaged in transverse grooves provided in said insulating layer.

6. A linear induction motor structure as defined in claim 5 wherein the layer of insulating material applied to the body of said inductor component is a synthetic resin of the thermo-setting type.

7. A linear induction motor structure as defined in claim 5 wherein the surfaces of said vanes are insulated and lie in direct contact with the coil units of said coil means.

8. A linear induction motor structure as defined in claim 1 wherein the thickness of the vane surfaces on said heat-radiating unit is equal to the distance between adjacent coils so as to make contact with the sides of said coils.

9. A linear induction motor structure as defined in claim 1 wherein the vane surfaces on said heat-radiating unit between adjacently positioned coils are constituted by two spaced vane elements so as to establish therebetween a channel for circulation of air.

* * * * *